Jan. 29, 1946.　　　G. A. PETROE　　　2,393,932
UNLOADING DEVICE
Filed June 3, 1944

INVENTOR
Gregory A. Petroe
BY
ATTORNEYS

Patented Jan. 29, 1946

2,393,932

UNITED STATES PATENT OFFICE 2,393,932

UNLOADING DEVICE

Gregory A. Petroe, Kenmore, N. Y., assignor to The Mathieson Alkali Works, Inc., New York, N. Y., a corporation of Virginia Application June 3, 1944, Serial No. 538,607

2 Claims. (Cl. 214—44)

This invention relates to suction means for unloading railroad cars containing materials in bulk, and is concerned more particularly with a novel device which may be readily attached to the bottom of the hopper of such a car and be operated by suction means for unloading the contents of the car.

At the present time, numerous granular and pulverulent materials, such as grains, soda ash, cement, and the like are shipped in bulk in hopper bottom cars and at their destination, such cars are unloaded by suction conveyor systems. Such a system, as ordinarily constructed, includes a source of suction and a conveyor line which may be flexible in part. At the car, means must be provided for connecting the conveyor line to the bottom of the hopper of the car in such manner that the material to be conveyed will pass from the hopper into the line and air may be admitted to mingle with the material to facilitate conveying.

The present invention is directed to the provision of a novel device which may be readily mounted at the bottom of the hopper of a car to serve as a means for directing the contents of the car into the suction line of the conveying apparatus. The new device also provides for the introduction of air into the line and the air admission means is so constructed that it cannot be clogged by the material and the amount of air admitted may be controlled. The new device is of simple, inexpensive construction and it can be quickly installed at the bottom of a hopper and connected to the conveyor line. In use, it requires little attention other than an initial adjustment and, when the unloading operation is completed, the device may be quickly removed and easily transferred and installed on another car.

Figure 1:
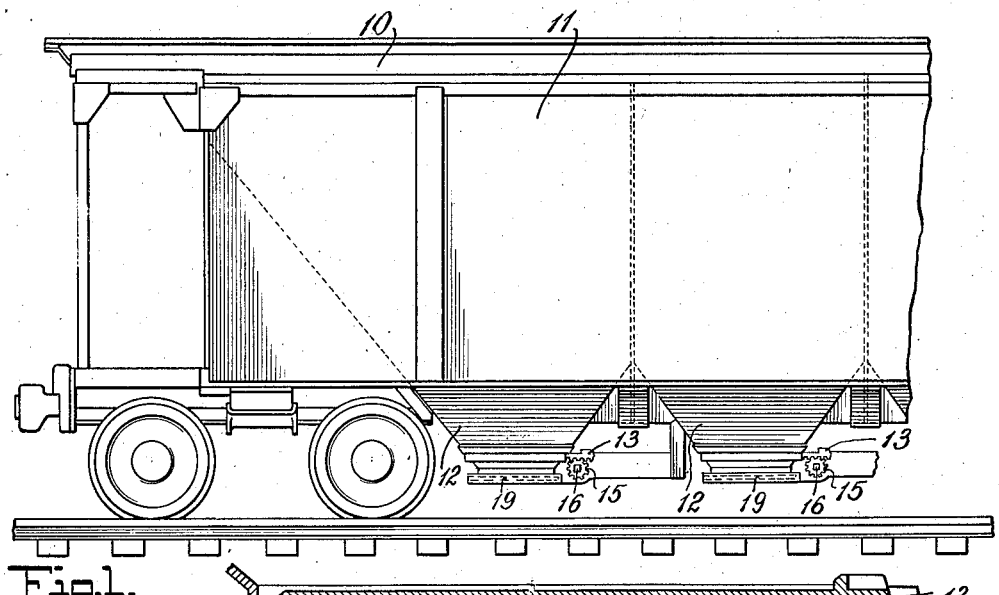
Figure 2:
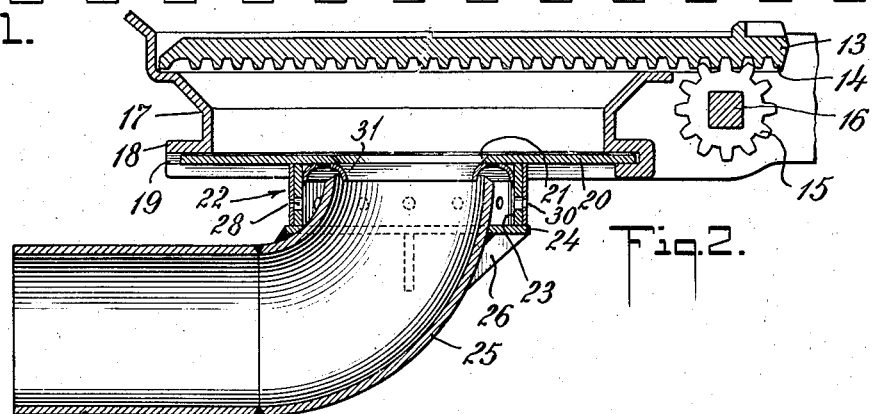
Figure 3:
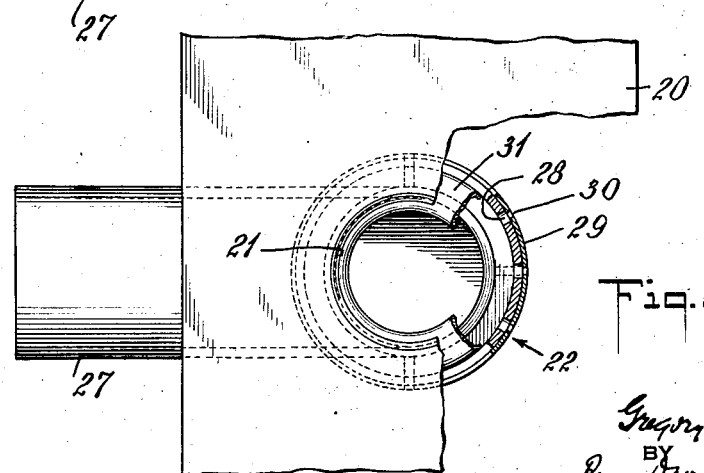

For a better understanding of the invention, reference may be had to the accompanying drawing in which Fig. 1 is a fragmentary view in side elevation of a hopper bottom car of the type with which the new device may be used;

Fig. 2 is a vertical sectional view through a part of the hopper of such a car as that shown in Fig. 1, with the new device in operative position; and Fig. 3 is a plan view of the new device with parts broken away and other parts shown in section.

The new unloading device is intended for use in unloading granular and pulverulent materials from hopper bottom cars, such as that designated 10. Such a car usually has a plurality of compartments 11 with hopper bottoms 12. When the compartments are loaded, their bottoms are closed by individual sliding gates 13, each of which is provided on its under surface with a rack 14 meshing with the teeth of pinion 15 mounted on a shaft 16 supported in any suitable way. By rotation of the shaft, the gate can be moved in its plane to open the bottom of the hopper.

Below the gate, the hopper is formed with a spout 17 provided with a flange 18 around three sides of the spout opening. The flange has an internal channel 19 into which may be inserted the plate 20 of the new unloading device.

Plate 20 is of sufficient size to close the lower end of the spout 17 and it is formed with a central opening 21. A casing generally designated 22 is attached to the lower surface of the plate around opening 21 and the casing can be advantageously made of a circular flange 23, the lower end of which is closed by a plate 24. The plate 24 has an opening generally aligned with the opening 21 and a tube 25 enters the casing through the opening in plate 24 and is secured tightly to the wall of that opening. The tube projects into the casing to terminate not far below the plate 20 and with the end aligned with the opening 21. The tube may be secured in place, if desired, by a plurality of supports 26, welded to the outer surface of the tube and to plate 24. In the construction illustrated, the tube 25 is of elbow form and it is provided with a horizontal extension 27 which may be connected to the end of the conveyor line in any suitable manner.

Air for conveying is admitted into the casing through inlets 28, which preferably take the form of holes drilled through the flange 23 in a row so that air enters around the entire end of the tube 25. The openings are preferably below the level of the open end of the tube and the flow of air through them is controlled by a damper in the form of a sleeve 29 encircling the flange 23 and formed with openings 30, which are in the same arrangement as openings 28 but slightly smaller. By turning the sleeve slightly with relation to the flange, the size of the effective passages for air through pairs of openings 28, 30 may be varied as desired.

In order that the air admitted into the casing may flow over the end edge of the tube and enter the interior thereof and the material flowing through openings 21 may not enter the casing rather than the tube and clog the air inlets, a suitable air guide means is mounted within the casing. In the construction shown, the guide takes the form of an annular plate 31 which is of curved cross-section and is mounted within the casing to overlie the end edge of the tube. The plate 31 may be held in position by being welded to the under side of plate 20 and it is of such shape that its outer edge makes contact with the inner surface of flange 23. The plate then extends upwardly and over the end edge of the tube and its inner edge lies within and below the top of the tube.

When the device is to be used for unloading a car, it is mounted in place, as shown in Fig. 1, to close the bottom of the hopper, and its tube 25, 27 is connected to the suction conveyor line. When the gate 13 is opened, the material in the car flows down to pass through the opening in plate 20 and enter the end of tube 25. At the same time, air is drawn into the casing around the end of the tube and flows upwardly along the concave surface of guide plate 31 to pass over the end edge of the tube. The air is thus distributed along the entire periphery of the end of the tube and a thorough mingling and mixture of the material and air are effected. The guide plate extends into the open end of the tube for a short distance so that the material flowing through opening 21 is guided into the end of the tube by the convex surface of the plate and the curtain of air entering the tube beneath the plate prevents material from escaping into the casing around the end of the tube. Clogging of the air inlets into the casing by the material is, accordingly, prevented.

I claim:

1. An unloading apparatus for use with a hopper bottom car, which comprises a plate adapted to be attached to the hopper of a car to close the bottom of the hopper, the plate having an opening therethrough, a circular flange attached to the bottom of the plate to surround the opening, a plate closing the lower end of the flange and having an opening aligned with that in the first plate, a tube mounted in the opening in the second plate and having an open end lying in alignment with the opening in the first plate and spaced from that plate, the other end of the tube being adapted to be connected to a suction device, a plurality of air inlets through the flange, and an annular plate of semi-circular section within the flange, the convex surface of the annular plate being secured to the under surface of the first plate and one edge of the annular plate abutting the inner surface of the flange and the other edge lying within the end of the tube and spaced from the inner wall thereof, said inlets being offset downwardly below the annular plate.

2. An unloading apparatus for use with a hopper bottom car, which comprises a plate adapted to be mounted on a hopper of the car to close the bottom of the hopper, the plate having an opening therethrough, a circular flange attached to the bottom of the plate and surrounding and spaced from the edge of the opening, a plate closing the lower edge of the flange and protruding beyond the flange, the second plate having an opening aligned with the opening in the first plate, a tube mounted in the opening in the second plate and having an open end in alignment with the opening in the first plate and spaced from that plate, the other end of the tube being adapted to be connected to a suction device, an annular plate of semi-circular cros-section lying within the flange and having its convex surface secured to the under surface of the first plate and its outer edge abutting the inner surface of the flange, the inner edge of the annular plate entering the open end of the tube and spaced from the inner wall thereof, a plurality of air inlets through the flange below the outer edge of the annular plate, and a sleeve encircling the flange to cover the inlets and supported on the protruding portion of the second plate, the sleeve having openings therethrough which may be aligned with the inlets by angular adjustment of the sleeve relative to the flange.

GREGORY A. PETROE.